(12) United States Patent
Hivatal et al.

(10) Patent No.: US 12,397,511 B2
(45) Date of Patent: *Aug. 26, 2025

(54) TAPE APPLICATOR WITH SPLIT WIPER

(71) Applicant: INTERTAPE POLYMER CORP., Sarasota, FL (US)

(72) Inventors: Endre Hivatal, Tampa, FL (US); Michael John Curtin, Fairfield, CT (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,569

(22) Filed: Jun. 10, 2024

(65) Prior Publication Data

US 2024/0326347 A1    Oct. 3, 2024

Related U.S. Application Data

(63) Continuation of application No. 17/532,528, filed on Nov. 22, 2021, now Pat. No. 12,005,651.

(60) Provisional application No. 63/116,554, filed on Nov. 20, 2020.

(51) Int. Cl.
| | | |
|---|---|---|
| *B29C 65/48* | (2006.01) | |
| *B29C 65/00* | (2006.01) | |
| *B29L 31/00* | (2006.01) | |
| *B65B 51/06* | (2006.01) | |

(52) U.S. Cl.
CPC ........ *B29C 65/4825* (2013.01); *B29C 66/851* (2013.01); *B65B 51/067* (2013.01); *B29L 2031/7162* (2013.01)

(58) Field of Classification Search
CPC .............. B29C 65/4825; B29C 66/851; B29C 66/81453; B29C 9/36; B65B 51/067; B29L 2031/7162

See application file for complete search history.

(56) References Cited

U.S. PATENT DOCUMENTS

| | | |
|---|---|---|
| 3,108,033 A | 10/1963 | Carter |
| 3,954,550 A | 5/1976 | Patterson |
| 4,039,367 A | 8/1977 | Warshaw et al. |

(Continued)

FOREIGN PATENT DOCUMENTS

| | | |
|---|---|---|
| CN | 200988595 Y | 12/2007 |
| CN | 201424149 Y | 3/2010 |

(Continued)

*Primary Examiner* — George R Koch
(74) *Attorney, Agent, or Firm* — Jeffrey R. Gray; Moore & Van Allen PLLC

(57) ABSTRACT

A tape applicator consistent with the present disclosure may include a tape applicator configured for applying a tape, such as a pressure sensitive adhesive tape to a carton (e.g., for sealing and/or assembling the carton). One or more rollers may be utilized to aid in applying the pressure sensitive adhesive tape to a carton. Furthermore, a wiper aids in applying pressure sensitive adhesive tape to a carton (e.g., before and/or after the one or more rollers). The wiper may be a split wiper having a first portion and a second portion, which allows for applying adhesive tape to a carton when the carton is under-packed or over-packed, and thus, the flaps of the carton are not level with respect to each other (e.g., the edges are not located in the same plane).

20 Claims, 13 Drawing Sheets

(56) References Cited

U.S. PATENT DOCUMENTS

| | | |
|---|---|---|
| 4,592,188 A | 6/1986 | Marchetti |
| 4,642,157 A | 2/1987 | Cavanagh |
| 4,738,075 A | 4/1988 | Marchetti |
| 4,813,206 A | 3/1989 | Dirusso et al. |
| 4,882,380 A | 11/1989 | Ficker et al. |
| 4,889,581 A | 12/1989 | Ulrich et al. |
| 4,936,945 A | 6/1990 | Marchetti |
| 5,223,075 A | 6/1993 | Sims |
| 5,439,549 A | 8/1995 | Fryc et al. |
| 5,725,721 A | 3/1998 | Yeh |
| 6,553,884 B1 | 4/2003 | Lhmann et al. |
| 6,571,848 B2 | 6/2003 | Tsuken et al. |
| 6,799,623 B1 | 10/2004 | Cheng |
| 7,836,932 B2 | 11/2010 | Lucht |
| 9,975,724 B2 | 5/2018 | Lam |
| 12,005,651 B2 * | 6/2024 | Hivatal ............... B29C 65/4825 |
| 2002/0005258 A1 | 1/2002 | Tsuken et al. |
| 2008/0264571 A1 | 10/2008 | Lam |
| 2009/0072071 A1 | 3/2009 | Lucht |
| 2010/0175836 A1 | 7/2010 | Lam |
| 2012/0111472 A1 | 5/2012 | Vega et al. |
| 2013/0048218 A1 | 2/2013 | Lam |

FOREIGN PATENT DOCUMENTS

| | | |
|---|---|---|
| CN | 101804924 A | 8/2010 |
| JP | 61104926 A | 5/1986 |
| JP | 05065140 A | 3/1993 |
| JP | 07149323 A | 6/1995 |
| JP | 07215316 A | 8/1995 |
| JP | 2002326292 A | 11/2002 |
| WO | 0202411 A1 | 1/2002 |

* cited by examiner

TAPE APPLICATOR WITH SPLIT WIPER

CROSS-REFERENCE TO RELATED APPLICATIONS

This application is a continuation of U.S. patent application Ser. No. 17/532,528 filed on Nov. 22, 2021, now U.S. Pat. No. 12,005,651 B2, which claims priority to U.S. Provisional Application No. 63/116,554 filed on Nov. 20, 2020, the entirety of which is incorporated herein by reference.

FIELD

The present invention relates to a tape applicator (tape head) for applying pressure sensitive adhesive tape to cartons, in particular, to a tape applicator having a wiper that improves the application of the tape to the cartons.

BACKGROUND

Industrial tape heads, also known as tape applicators, employ rollers, brushes, sleds, and/or wipers for applying pressure to an adhesive tape for application of the adhesive tape to a carton, such as a cardboard box. In particular, rollers are used to apply pressure to the adhesive tape for application of the adhesive tape to the carton, and optionally brushes, sleds, wipers, or the like are used to aid in further applying pressure to the adhesive tape for applicator to the carton and/or applying pressure to portions of the adhesive tape that did not get applied to the carton by the rollers.

SUMMARY

Embodiments of the present disclosure include a tape applicator configured for applying a tape, such as a pressure sensitive adhesive tape to a carton (e.g., for sealing and/or assembling the carton). One or more rollers may be utilized to aid in applying the pressure sensitive adhesive tape to the carton. Furthermore, a wiper is used to apply the pressure sensitive adhesive tape to a carton (e.g., before and/or after the one or more rollers), which includes providing additional pressure to the tape that has already contacted to the carton and/or to applying pressure to the tape where the roller did not apply the tape to the carton, as will be discussed in further detail herein. In particular, the present disclosure may provide a tape applicator having an improved wiper (e.g., a split wiper) that allows for sealing of adhesive tape to a carton when the carton is under-packed or over-packed, and thus, the flaps of the carton are not level with respect to each other (e.g., the edges are not located in the same plane). The wiper (e.g., the split wiper) may be formed of a material that allows the wiper to act like a spring, such that it can be bent from a resting position to a curved position during application of the tape and spring back into the resting position. Furthermore, the wiper may have an edge (e.g., sharp edge, or the like) that may aid in applying the pressure sensitive tape to the carton (e.g., massage the tape into the fibers of the corrugated carton). The tape applicator may further include a cutting blade that is stationary or in some embodiments configured to swing, or pivot, into a web of tape in order to cut the tape (e.g., once a desired length of tape has been applied to a carton).

One embodiment of the disclosure comprise a tape applicator having one or more support members, and a wiper having a first portion and a second portion. The first portion and the second portion of the wiper are operatively coupled to the one or more support members, and the first portion flexes independently from the second portion.

In further accord with embodiments of the disclosure, the first portion and the second portion are independent portions that are operatively coupled to one of the one or more support members independently.

In other embodiments of the disclosure, the first portion comprises a first free end and a first fixed end, and the second portion comprises a second free end and a second fixed end.

In still other embodiments of the disclosure, the first portion is operatively coupled to the second portion and to a support member of the one of the one or more support members.

In yet other embodiments of the disclosure, the first portion is operatively coupled to the second portion using a retainer member.

In further accord with embodiments of the disclosure, the first portion comprises a first projection, and the second portion comprises a second projection. The first projection and the second projection restrict movement of the retainer member.

In other embodiments of the disclosure, the first projection forms a first channel in the first free end and the second projection forms a second channel in the second free end.

In still other embodiments, the tape applicator further comprises fasteners operatively coupling the first portion and the second portion to the one or more support members. The retainer member has retainer member apertures and the first fixed end has a first aperture and the second fixed end has a second aperture. The fasteners operatively couple the retainer member, the first fixed end, the second fixed end, and the support member through the retainer member apertures, the first aperture, and the second aperture.

In yet other embodiments, the tape applicator further comprises couplings operatively coupling the first fixed end of the first portion and the second fixed end of the second portion to the one or more support members.

In further accord with embodiments of the disclosure, the first fixed end and the second fixed end are angled with respect to the first free end and the second free end.

In other embodiments of the disclosure, the first fixed end and the second fixed end have a fixed end thickness and the first free end and the second free end have a free end thickness. The first end thickness is greater than the free end thickness.

In still other embodiments of the disclosure, the fixed end thickness tapers to the free end thickness.

In yet other embodiments of the disclosure, the first free end and the second free end comprise a profile on a surface.

In further accord with embodiments of the disclosure, a first edge on the first free end and a second edge on the second free end are angled outwardly from outer edges to inner edges of the first portion and the second portion.

In other embodiments of the disclosure, the first edge and the second edge comprise a sharp edge that comes to a point.

In still other embodiments of the disclosure, the wiper is made of polypropylene.

In yet other embodiments of the disclosure, the one or more support members comprise the front applicator arm, the rear applicator arm, a portion of the frame, or a portion of a frame cover.

Another embodiment of the invention comprises a method of applying tape to cartons using a tape applicator. The method comprises applying the tape to a first flap and a second flap of a carton using the tape applicator. The method further comprises applying pressure to the tape using a first wiper portion and a second wiper portion. The first wiper portion flexes independently of the second wiper portion to allow the first wiper portion to apply pressure to the tape on the first flap and the second wiper portion to apply pressure to the tape on the second flap independently of the first wiper portion.

In further accord with embodiments of the invention, the first wiper portion is operatively coupled to the second wiper portion using a retainer member.

In other embodiments of the invention, the first wiper portion comprises a first projection and the second wiper portion comprises a second projection. The first projection and the second projection restrict movement of the retainer member.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The drawings illustrate embodiments of the invention, and are not necessarily drawn to scale, wherein.

DETAILED DESCRIPTION

Figure 1:
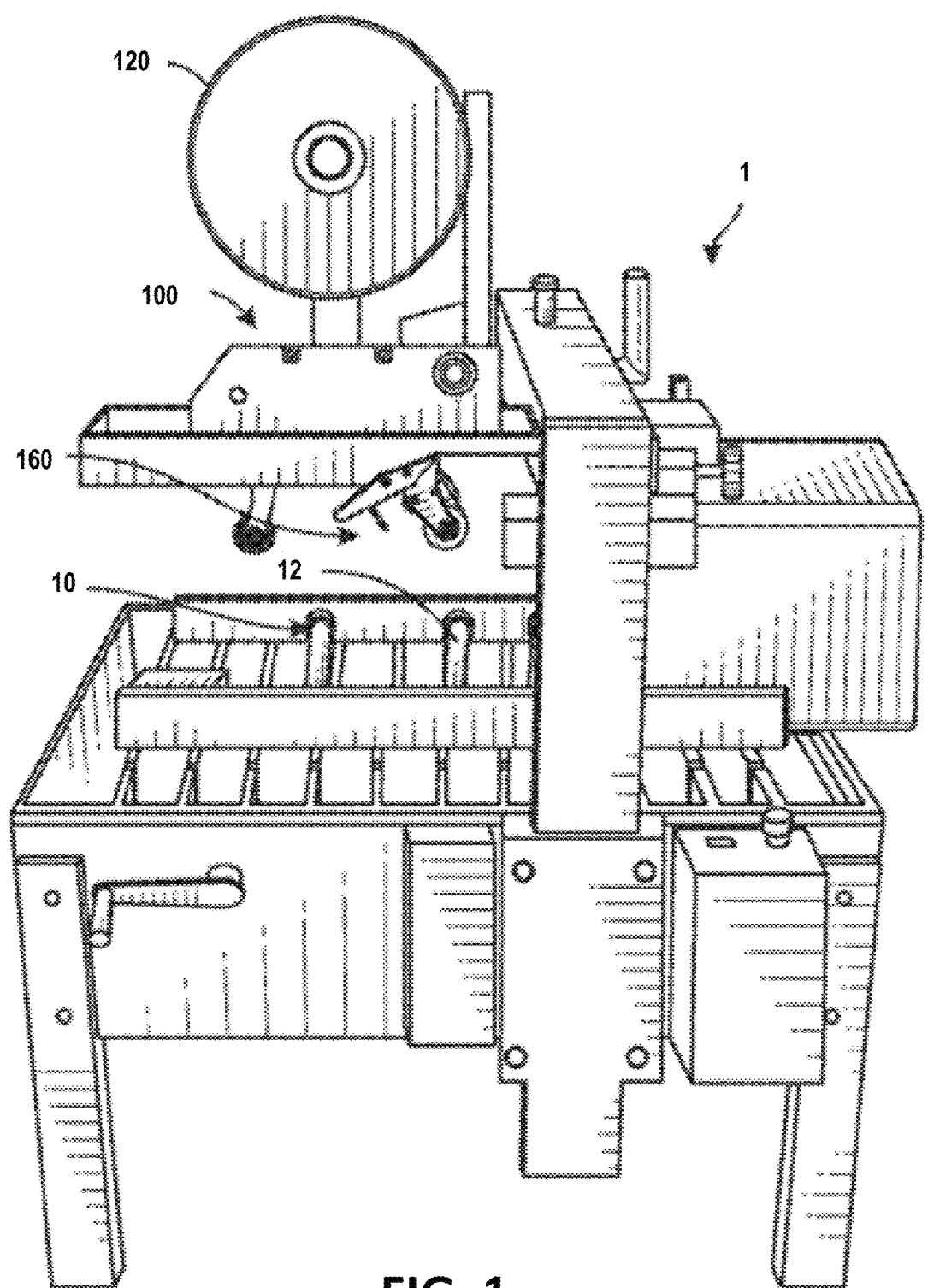
FIG. 1 is a perspective view of a conventional carton sealing machine, in accordance with embodiments of the present disclosure.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some implementations, a tape applicator consistent with the present disclosure may include a tape applicator configured for applying a tape, such as a pressure sensitive adhesive tape, to a carton (e.g., for sealing and/or assembling the carton). One or more rollers may be utilized to aid in applying the pressure sensitive adhesive tape to the carton. Furthermore, a wiper is used to apply the pressure sensitive adhesive tape to the carton (e.g., before and/or after the one or more rollers), which includes providing additional pressure to the tape that has already contacted to the carton and/or to applying pressure to the tape where the roller did not adhere the tape to the carton, as will be discussed in further detail herein. In particular, the present disclosure may provide a tape applicator having an improved wiper (e.g., a split wiper) that allows for sealing of adhesive tape to a carton when the carton is under-packed or over-packed, and thus, the flaps of the carton are not level with respect to each other (e.g., the edges are each flap are not located in the same plane). The tape applicator may also include a cutting blade, which may be configured to swing, or pivot, into a web of tape in order to cut the tape (e.g., once a desired length of tape has been applied to a carton).

As illustrated in FIGS. 1-4, a tape applicator 100 (otherwise called a tape head) is disclosed that includes an improved wiper 200, as will be described herein. In the illustrative embodiment, the tape head 100 includes a main frame 108 on which the various operating parts of the tape head are mounted and a cover plate 109 protecting the various operating parts. The tape roll support arm 110 is operatively coupled to (e.g., mounted on, or the like) and extends from the main frame 108 and has adjacent to its free end 112 a rotatable hub 114 (e.g., otherwise described as a spindle, mandrel, or the like) mounted on a shaft 116 on which the tape roll 120 is operatively coupled (e.g., mounted, or the like) and from which a ribbon of tape T is dispensed along a tape path shown by the tape T. The tape rolls 120 may be any size. However, in some embodiments a new tape roll 120 may have an outside diameter of approximately 16 inches (or any other diameter based on the type of roll) and may weigh approximately 14 pounds (or have any other weight based on the type of roll). During operation of the tape applicator 100, the tape roll 120 may be consumed, such that the outside diameter and the weight of the tape roll 120 decrease. After the tape roll 120 is consumed, the outside diameter of the stub of the tape roll (with some remaining tape or without any tape) may be approximately 3 inches (or any other diameter based on the type of roll) and may weigh approximately 0.5 pounds (or any other weight based on the type of tape roll and stub material).

As further illustrated in FIGS. 1-4, the tape T passes over a peel-off roller 124 operatively coupled (e.g., mounted, or the like) to a peel-off arm 126. The peel-off roller 124 may be positioned at or proximate a free end 128 of the peel-off arm 126 proximate (e.g., adjacent to, or the like) the tape roll 120. The peel-off arm 126 may be pivotably mounted to the main frame 108, and its free end 128 may be biased by a pivot biasing member 125 (e.g., spring, such as a torsion spring, or the like) toward the roll 120 to hold the peel-off roller 124 in contact with the periphery of the tape roll 120. As such, the pivot biasing member 125 allows the peel-off roller 124 to move in an arc between the full diameter (e.g., 16 inch outside diameter, or the like depending on the size of the roll) of a tape roll 120 to a stub diameter (e.g., 3 inch outside diameter, or the like depending on the size of the roll) of the tape roll 120 after the tape has been consumed or mostly consumed. The pivot biasing member 125 that biases the peel-off roller 124 against the tape roll 120 may aid in regulating over spin of the tape roll 120. That is, without holding (e.g., biasing) the peel-off roller 124 against the tape roll 120, the tape roll 120 may over spin (e.g., more than a half-turn) after sealing a first box, and consequently the tape applicator 100 would have to pull the excess tape taught and/or spin the tape roll 120 in the reverse direction to the peel-off location of the peel-off roller 124 in order to allow the tape applicator 100 to seal a second box. Moreover, in addition to moving in an arc, the peel-off arm 126 may include a damper member 129 (e.g., one or more compression springs, such as two compression springs, or the like) that act as a shock absorber in order to absorb forces during operation of the tape applicator 100. As such, the peel-off arm 126 may include one or more rods that are slidable within a housing through the use of the damper member 129. As such, the damper member 129 allows the length of the peel-off arm 126 to change (e.g., as the one or more rods slide with respect to the housing through the compression springs), and thus, allows the peel-off roller 124 to move along with the changing length of the peel-off arm 126.

During operation of the tape applicator 100, a carton may enter the tape applicator at a speed of 120 ft/m (or other speed depending on the type of tape applicator). As such, when a carton enters the tape applicator 100, the tape roll 120 moves from a static position to dynamic positions (e.g., from 0 to 120 ft/m, or the like) in order to begin dispensing tape from the tape roll 120 for sealing the carton. In typical configurations, due to the instant high speed movement of the tape roll 120, the tape may be prone to breaking (e.g., in particular, when the tape is thin, or the like). Additionally, different types of tapes having different adhesives (e.g., hot melt, acrylic, natural rubber, or the like) and/or having different types of release coatings (e.g., on the outer surface of the tape, or in some cases on the adhesive side of the tape), may change the force required to peel the tape off of the tape roll 120. That is, the tape adhesive and/or the release coating (e.g., type and/or amount of coating) may make it more difficult (e.g., sticky adhesive, such as natural rubber, with no release coating, or the like) or less difficult (e.g., less sticky adhesive with a release coating, or the like) to peel the tape off of the tape roll 120. Consequently, depending on the type of tape adhesive and/or release coating, the force to peel the tape off of the tape roll 120 may change with different tape rolls 120.

Unlike traditional configurations, the pivot biasing member 125 and/or the damper member 129 of the present disclosure may allow the tape roller 124 to move, such as pivot along an arc due to the pivot biasing member 125 and/or move along with a changing length of the peel-off arm 126 due to the damping member 126 (e.g., due to compression and extension of the one or more compression springs). As such, the peel-off roller 124 may "dance" (e.g., move along the arc and/or move with a changing length of the peel-off arm 126) as the tape T moves over the peel-off roller 124 due to the instant movement of the static tape roll 120, the weight of the tape roll 120, the diameter of the tape roll 120, type of tape adhesive, presence or type of release coating, the size of the carton, or the like as the carton is being sealed. This "dancing" of the peel-off roller 124 dampens the forces on the tape being peeled off of the tape roll 120, and thus, reduces the chances of the tape breaking.

Figure 2:
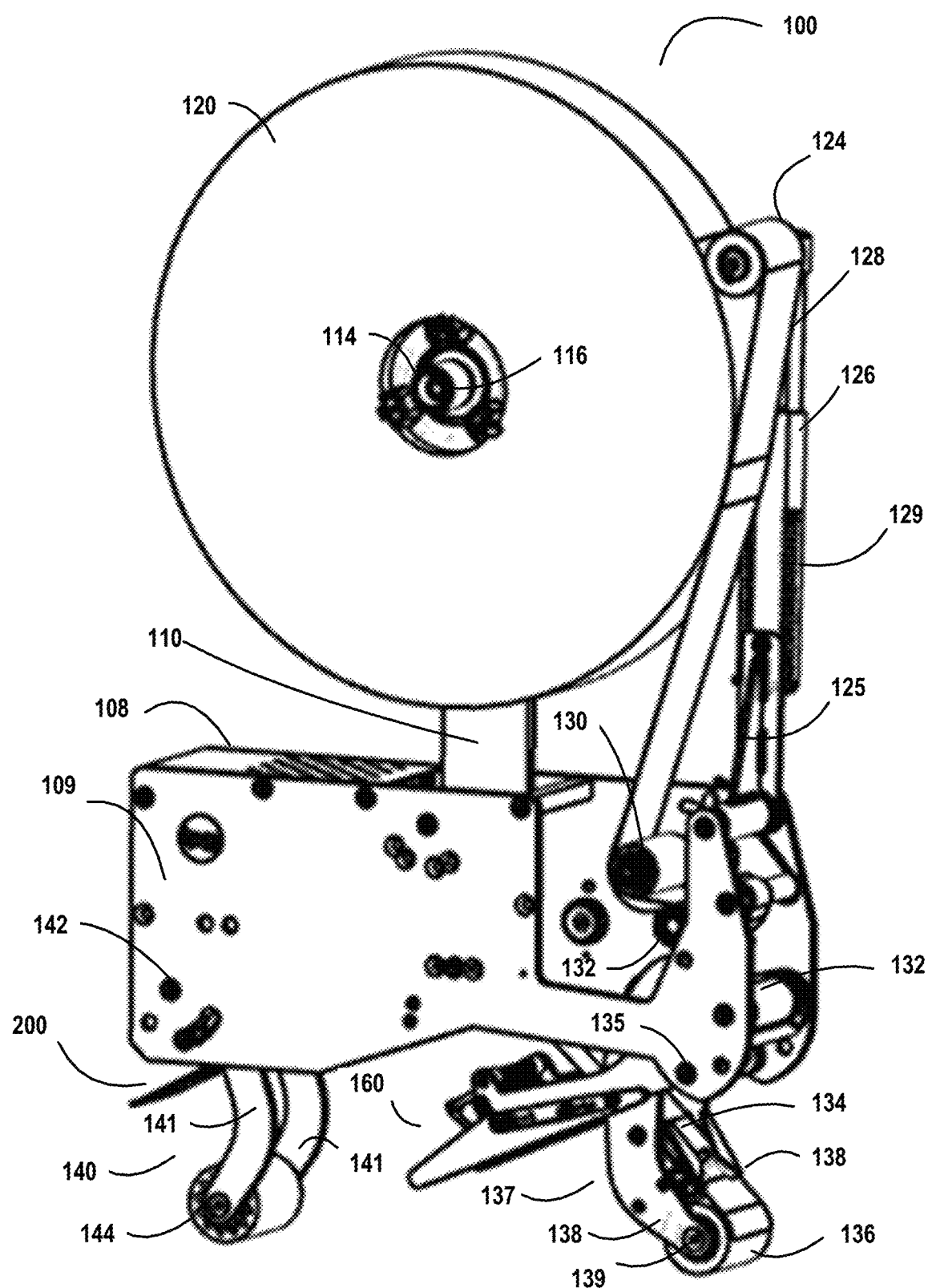
FIG. 2 is a perspective side view of a tape applicator for a carton sealing machine, in accordance with embodiments of the present disclosure.
Figure 3:
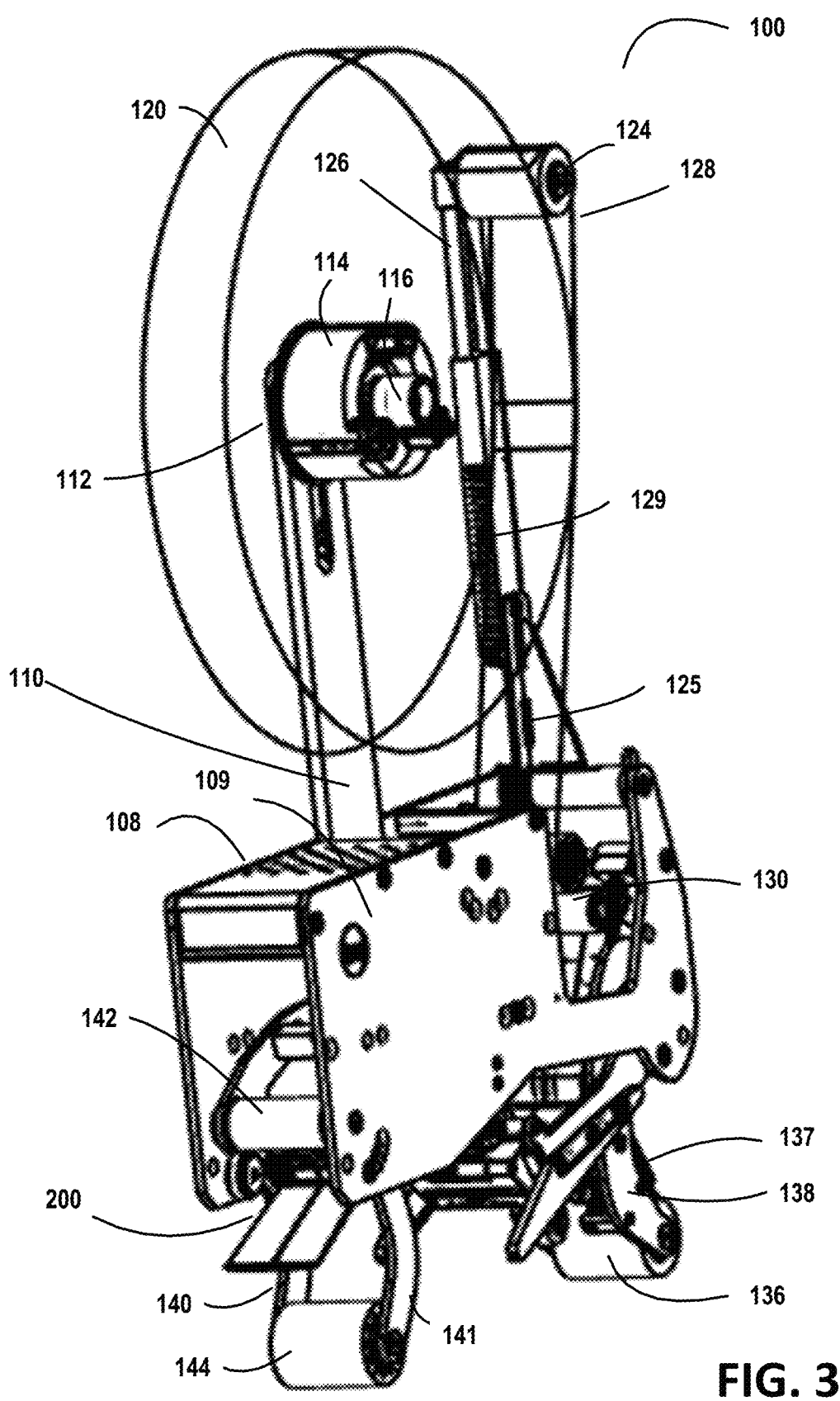
FIG. 3 is a perspective rear view of a tape applicator for a carton sealing machine, in accordance with embodiments of the present disclosure.
Figure 4:
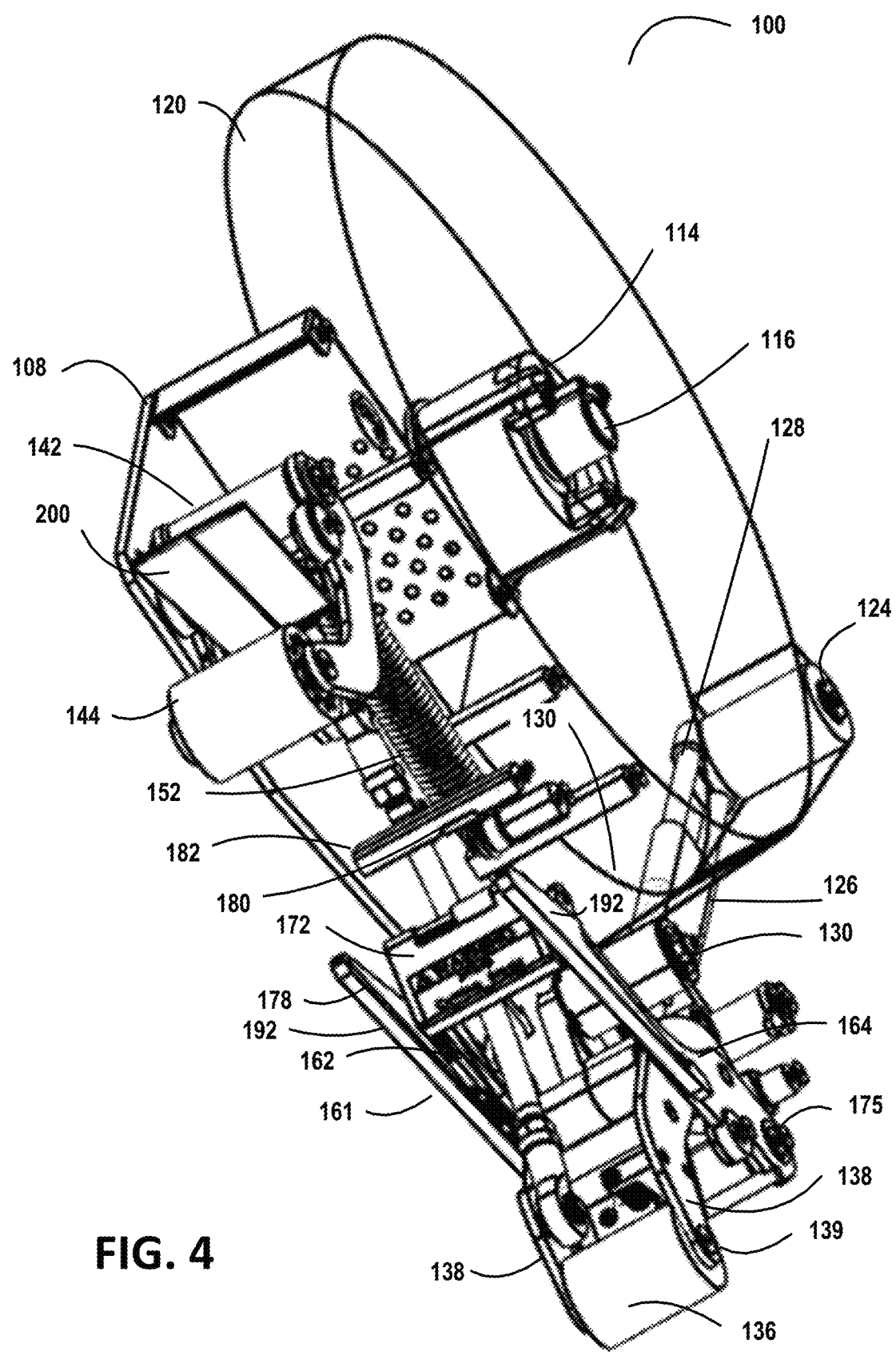
FIG. 4 is a perspective bottom view of a tape applicator for a carton sealing machine, in accordance with embodiments of the present disclosure.

The tape T may also extend over a clutch roller 130 and one or more guide rolls 132, and through a tape guide 134 (sometimes referred to as a tape shoe) to a front applicator roll 136 that applies a leading end L of the tape T to a carton (shown in FIG. 13A) that is to be taped. In the illustrated tape applicator 100, the front applicator roll 136 and the tape guide 134 (or guide rolls in an alternate embodiment, not shown) are mounted on a front applicator arm 137, including opposing side arms 138 pivotally mounted to the main frame 108 as indicated in FIGS. 2-4. The front applicator roll 136 may be rotatably mounted on the front applicator arm 137 proximate its free end 139 remote from the pivotal mount 175. It will be appreciated that various additional and/or alternative roller configurations may be implemented for directing the tape from a dispensing roll and orienting the tape for application to a carton.

Figure 13A:
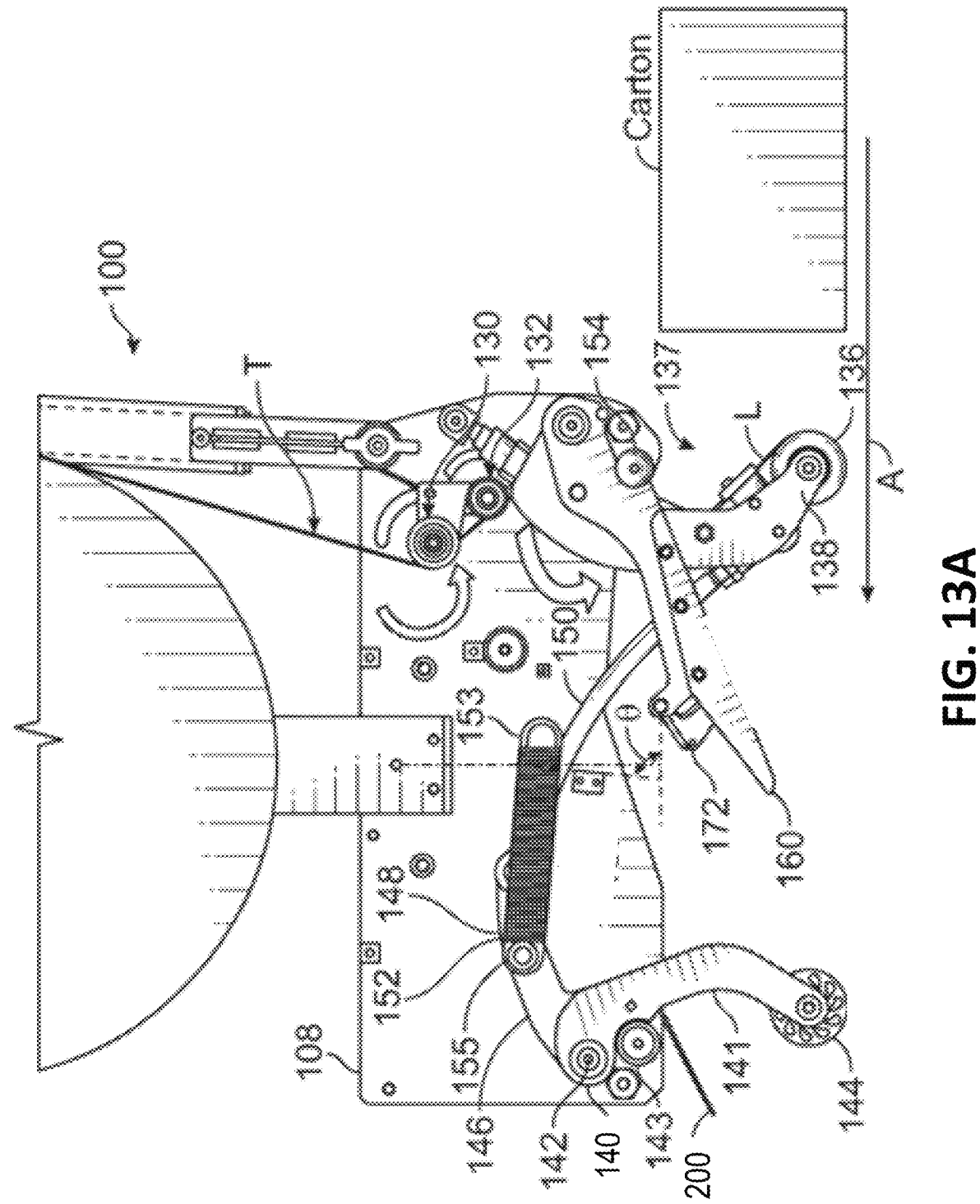
FIG. 13A is side view of the components of the tape applicator when applying tape to a carton, in accordance with embodiments of the present disclosure.

Continuing with the illustrated tape applicator 100, a rear applicator arm 140, including opposing side arms 141, may be pivotably mounted to the main frame 108 on pivot mount 142. A rear applicator roll 144 may be rotatably mounted on the rear applicator arm 140 proximate its free end 145 remote from the pivotal mount 142. Moreover, as illustrated in FIG. 13A, a push bar 146 and the rear applicator arm 140 may be mounted on a pivot mount 142 proximate the rear of the tape head 100, and a first end 148 of the push bar 146 may be operatively coupled to the front applicator arm 137 by linkage 150. A main spring 152 may extend generally parallel to the main frame 108 and may be operatively coupled to the main frame 108 and/or the cover frame 109 at a first end 153 (e.g., first loop or front loop) and to the push bar 146 at a second end 155 (e.g., second loop or rear loop) thereof to bias the front and rear applicator arms 137, 140 in concert to a receiving position ready to receive the next carton or box to be taped. The movement of the front and rear applicator arms 137, 140 may be limited by the presence of a stop, such as a rear bumper 143 positioned proximate the rear applicator arm 140. The wiper 200, which will be discussed in further detail herein, may be operatively coupled to any support member (e.g., frame, bar, plate, coupling, face, cover, or the like) of the tape applicator 100. In some embodiments the wiper 200 may be positioned downstream of the rear applicator arm 140; however, it should be understood that the wiper 200 may be located downstream and/or upstream of the front applicator arm 137 and/or the rear applicator arm 140. Moreover, it should be understood that a first wiper portion 210 and a second wiper portion 240 may be operatively coupled to the same or different support members (e.g., one or more support members). As such, the first wiper portion 210 may be operatively coupled to a first support member, while a second wiper portion 240 may be operatively coupled to a second support member. As such, the first wiper portion 210 may be located apart from the second wiper portion 210, such that the first wiper portion 210 may be located downstream or upstream of the front applicator arm 137 and/or the rear applicator arm 140, while the second wiper portion 240 may be located in a different location downstream or upstream of the front applicator arm 137 and/or rear applicator arm 140. It will be appreciated that the described front applicator and rear applicator systems provide a possible arrangement for applying and adhering a tape along a desired expanse of a carton. It will be further appreciated that various additional and/or alternative arrangements for applying and adhering the tape to a carton may also be utilized without materially departing from the present disclosure.

The tape applicator 100 may further include a blade for cutting a tape applied to a carton, and a magnetically actuated blade guard for selectively exposing and covering or protecting the blade. Consistent with an illustrative example embodiment, an arrangement for severing an applied length of tape T after the tape has been applied to a carton moving in a tape application direction designated by arrow A in FIG. 13A may include a knife arm assembly 160. The knife arm assembly 160 may include parallel side plates 162 and 164, defining a knife arm 161. The parallel side plates 162, 164 may act as arm extensions (or may include arm extensions 192) to set the timing of the swing of the knife arm 160, and thus, set when the tape is cut. It should be understood that the side plates 162, 164 and arm extensions 192 may be separate parts or may be integral parts. The side plates 162, 164 may be connected proximate their respective rear ends by one or more shafts. Additionally, the side plates 162 and 164 may be connected to one another, and to the main frame 108 by pivotal mount 175, proximate the respective front ends of the side plates 162 and 164, as illustrated in FIG. 4. The pivotal mount 175 may rotatably operatively couple the side plates 162 and 164 to the main frame 108 and/or the cover frame 109. The side plates 162 and 164 may be spaced apart from one another to receive tape T therebetween. In particular, the tape may be received between the side plates 162 and 164 after the tape has been applied to a carton by the front application roll 136. The movement of the knife arm assembly 160 (e.g., pivotal movement relative to the main frame 108) may be limited by a stop, such as front bumper 154. Consistent with the illustrative embodiment, the one or more shafts may also support a spring that may bias a blade guard 172 to a closed position over a blade 174. In such an arrangement, both the guard 172 and the blade 174 pivotally move with the knife arm assembly 160 relative to the main frame 108.

The guard 172 may be magnetically actuated in order to move the guard between the opened and closed positions. For example, in the illustrated embodiment, the knife arm assembly 160 may include a magnet mounted in a stationary position relative to the main frame 108. The magnet 180 may be provided as part of, and or attached to, one of the cross bars 182 between the main frame 108 and the cover frame 109, which will be referred to as the magnetic cross bar 182. The magnetic cross bar 182 may be positioned to place the magnet 180 at a position proximate guard 172 to interact with a catch that is part of the guard 172, in at least some positions of the knife arm 161. As will be discussed in greater detail below, the catch may include a feature that may experience a magnetic attraction with the magnet 180. Accordingly, the relative positioning of the magnet 180 and the catch (e.g., which may be part of, and/or associated with, the guard 172) may allow the magnet 180 and the catch 186 to be operatively attracted, in at least some positions of the knife arm 161, to move the guard 172 to the open position to expose the blade 174 to the tape T at the time cutting of the tape is desired. The operative attraction between the magnet 180 and the catch may be released in other positions of the knife arm 161 to allow the guard 172 to be moved to the closed position covering the blade 174.

As generally indicated above, the knife arm assembly 160 may include knife arm 161 that may be rotatably mounted relative to the main frame 108. In particular, the knife arm 161 may be capable of rotating between a position adjacent the main frame 108 (e.g., with the knife arm 161 rotated in toward the main frame 108) and a position spaced from the main frame (e.g., with the knife arm 161 rotated out from the main frame 108). During a taping process, a carton may move under (or over) the tape head 100 (e.g., via a suitable conveyer, roller, or other feed mechanism). During such a taping process, the knife arm 161 may be biased away from the main frame 108, and into contact with the carton being taped. Accordingly, as the carton is fed passed the tape applicator 100, the knife arm 161 may be pushed toward a position adjacent to the main frame 108 by the carton. As the carton passes 161 the tape head, the knife arm 161 may no longer be in contact with the carton, and the biasing force and the knife arm 161 may cause the knife arm 161 to rotate to a position further away from the main frame 108 (e.g., further away from the main frame 108 than when the carton was restricting rotational movement of the knife arm 161).

The knife arm assembly 160 may include a compression spring that may be adjustable to increase or decrease the biasing force toward a carton and may be connected to at least one of the side plates 162, 164. In particular, the compression spring may be adjusted to bias the knife arm assembly 160 to a normal position placing edge surfaces 178 of the side plates 162, 164 that face a carton into direct contact with the carton, which will trace along the carton as the carton passes through a carton sealing machine. In some embodiments, the knife arm 161, on each of the side plates 162, 164 and/or the extensions 192 may define the edge surface 178 that contacts a carton. In some embodiments, the side plates 162, 164 and/or the extensions 192 may be releasably mountable to the side plates 162, 164 (e.g., which may allow positioning of the extensions 192 in one or more of a plurality of positions 194 along the length thereof of the side plates 162, 164). The plurality of positions may provide de facto timing positions for the cut of the tape, dependent on carton speed. That is, when the carton moves passed the knife arm 161 (e.g., passed the end of the extensions 192), the knife arm 161 may rotate away from the main frame 108 (e.g., as the knife arm 161 may no longer be blocked from such rotation by the carton). During the rotation of the knife arm 161 away from the main frame 108, the interaction between the magnet 180 and the catch 186 may temporarily move the guard 172 to the open position, exposing the blade 174 for cutting the tape, as will be described with respect to FIGS. 13A-13G.

Figure 6:
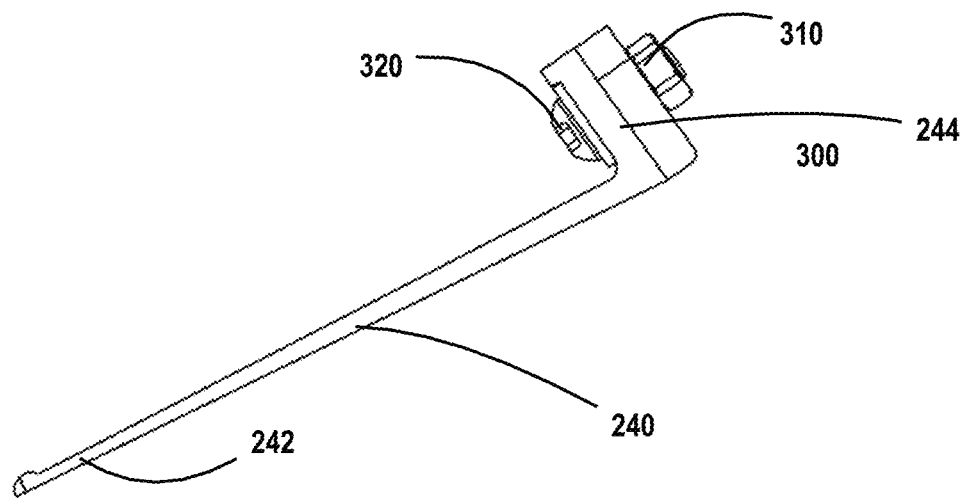
FIG. 6 is a side view of a split wiper of the tape applicator, in accordance with embodiments of the present disclosure.
Figure 7:
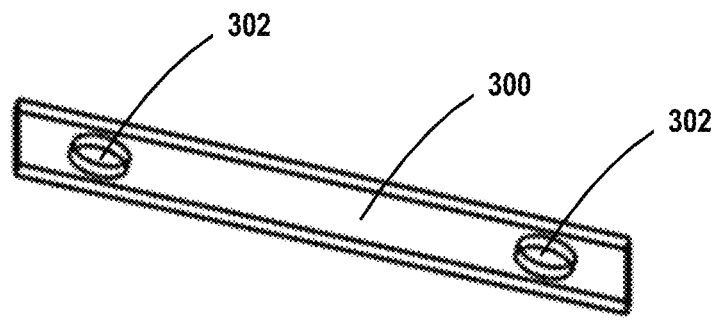
FIG. 7 is a perspective view of a retainer member of a split wiper of the tape applicator, in accordance with embodiments of the present disclosure.
Figure 8:
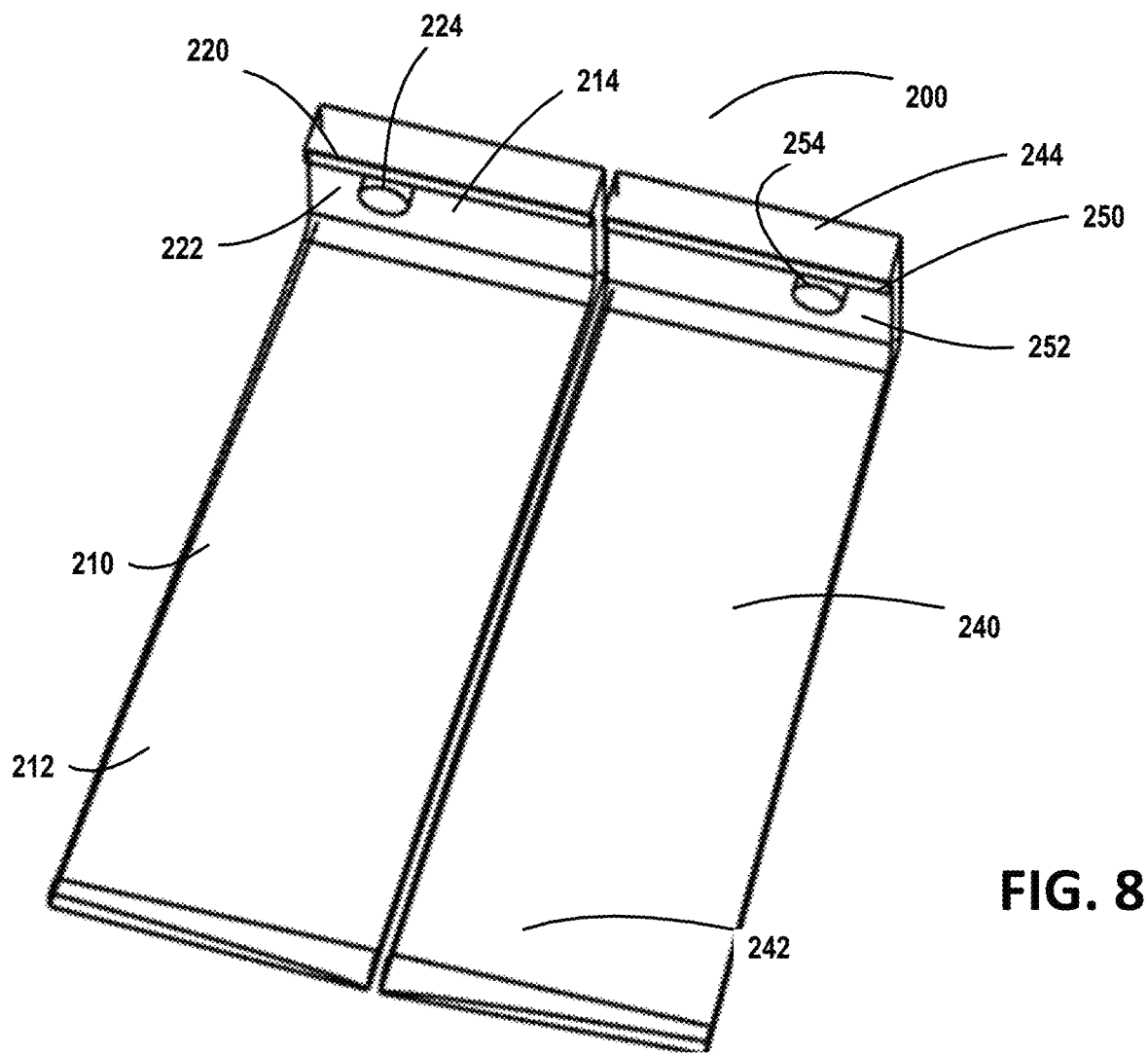
FIG. 8 is a perspective view of a first wiper portion and a second wiper portion of the split wiper of the tape applicator, in accordance with embodiments of the present disclosure.
Figure 9:
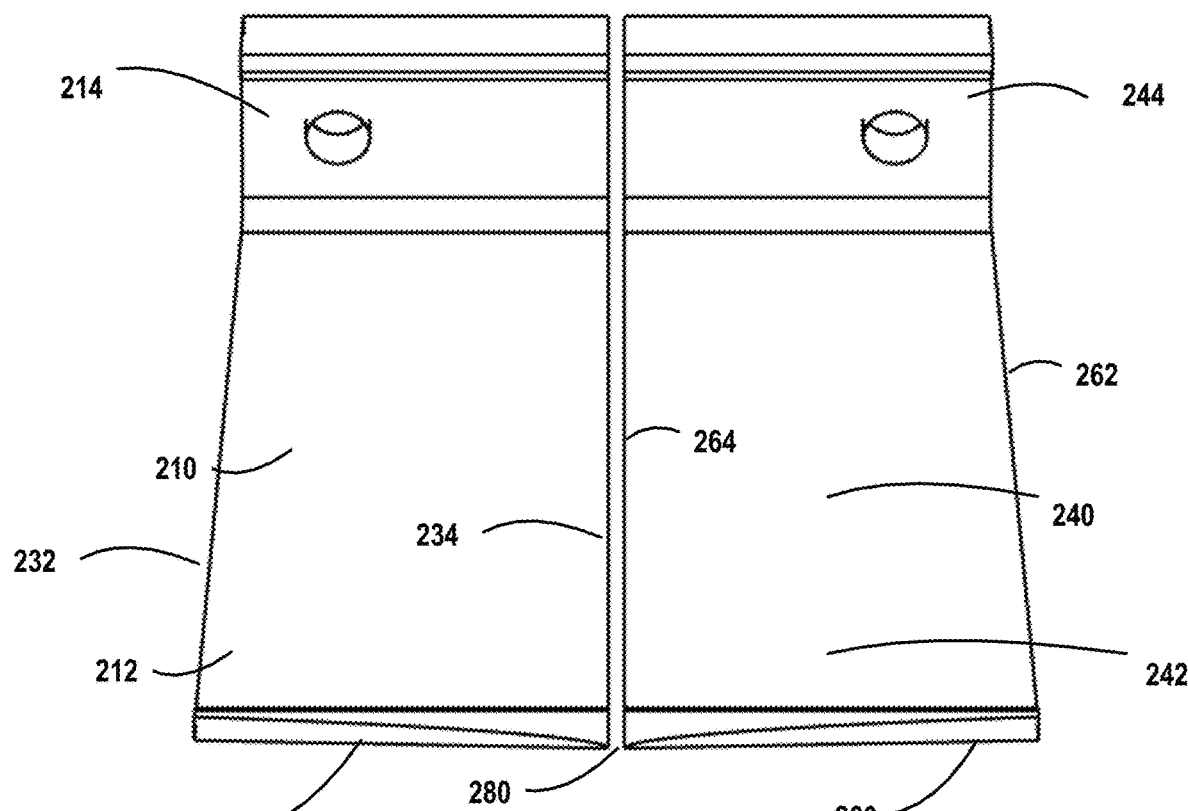
FIG. 9 is a front view of a first wiper portion and a second wiper portion of the split wiper of the tape applicator, in accordance with embodiments of the present disclosure.
Figure 10:
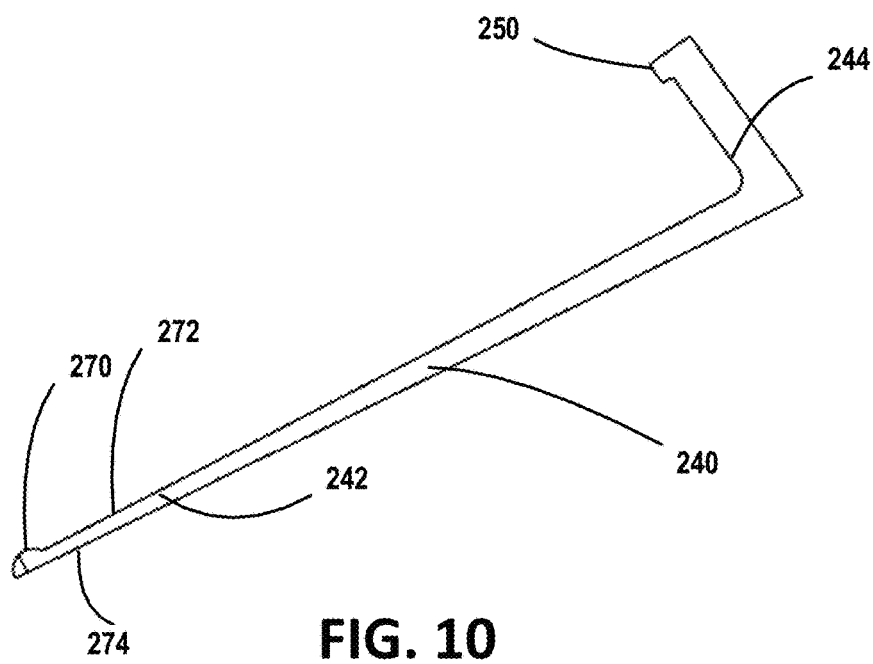
FIG. 10 is a side view of a second wiper portion of the split wiper of the tape applicator, in accordance with embodiments of the present disclosure.

As illustrated in FIGS. 5-12, the wiper 200 may comprise a split wiper having a first portion 210 and a second portion 240 (e.g., two separate portions). In some embodiments, as illustrated in the FIG. 5-12, the first portion 210 may have a free end 212 separated from a fixed end 214 (e.g., the end that is configured to be fixed to the tape applicator 100). In some embodiments the free end 212 and the fixed end 214 are operatively coupled together, such as integrally formed or are separate and coupled together. In some embodiments, as illustrated in FIGS. 8 and 10, the fixed end 214 may be generally perpendicular with the free end 212 (e.g., +/−5, 10, 15, 20, 25, 30, or the like from 90 degrees). In other embodiments, the fixed end 214 and free end 212 may be oriented in the same plane (not illustrated), or at another angle with respect to each other. The first portion 210 may have one or more first projections 220 that form a first channel 222, such as in the fixed end 212 as illustrated in FIG. 8.

In some embodiments, as illustrated in FIGS. 5-12, the second portion 240, like the first portion 210, may have a free end 242 separated from a fixed end 244. In some embodiments the free end 242 and the fixed end 244 are operatively coupled together, such as integrally formed or are separate and coupled together. As illustrated in FIGS. 8 and 10, the fixed end 244 may be generally perpendicular with the free end 242 (e.g., +/−5, 10, 15, 20, 25, 30, or the like from 90 degrees). In other embodiments, the fixed end 244 and free end 242 may be oriented in the same plane (not illustrated), or at another angle with respect to each other. The second portion 240 may have one or more first projections 250 that form a second channel 252, such as in the fixed end 244 as illustrated in FIG. 8.

Figure 5:
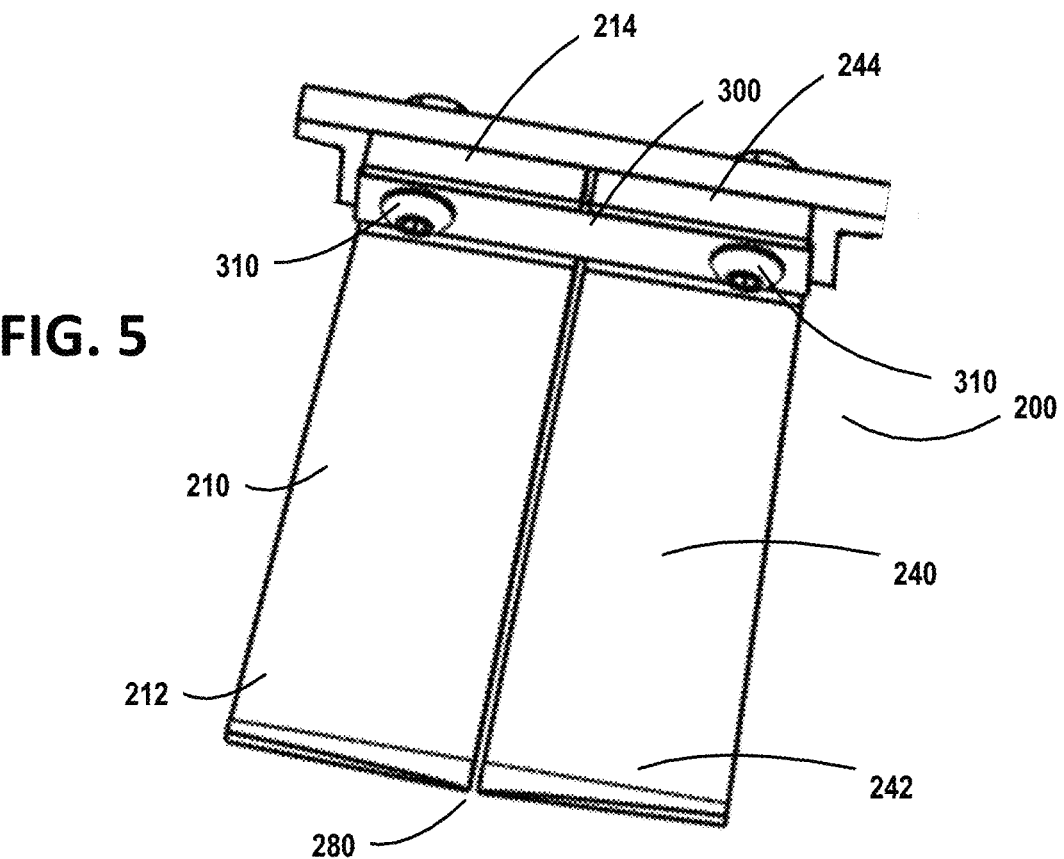
FIG. 5 is a perspective view of a split wiper of the tape applicator, in accordance with embodiments of the present disclosure.

As illustrated in FIGS. 5-7, a retainer member 300 (otherwise described as a retaining member) and/or connectors 310, such as fasteners 320 (e.g., screws, bolts, rivets, pins, nuts, caps, or the like), may be utilized to operatively couple the first wiper portion 210 and the second wiper portion 240 to the tape applicator 100. The wiper 200 may be operatively coupled to any portion of the tape applicator 100, such as any support member of the tape applicator 100. The support member may be the front applicator arm 137, the rear applicator arm 140, another arm, a portion of the frame 108, the frame cover 109, another support in the tape applicator 100, or any other portion of the tape applicator 100. In some embodiments, the retainer member 300 (e.g., washer, plate, tab, or the like) may be operatively coupled to the fixed ends 214, 244 of the first wiper portion 210 and the second wiper portion 240. For example, the retainer member 300 may be located on the first wiper portion 210 and second wiper portion 240, and held in place by the one or more first projections 220 of the first fixed end 214 and/or the one or more second projections 250 of the second fixed end 244. When the one or more projections 220, 250 form a first channel 222 and a second channel 252, the retainer member 300 may fit within the first channel 222 of the first wiper portion 210 and/or the second channel 252 of the second wiper portion 240. It should be understood that the retainer member 300 may be equal to, less than, or greater than the length of the first channel 222 and the second channel 252, and equal to, less than, or greater than the depth of the first channel 222 and the second channel 252. In the embodiments illustrated in FIGS. 5 and 6, the retainer member 300 is equal to the length and depth of the first channel 222 and the second channel 252. Moreover, as illustrated in FIGS. 5 and 6, the retainer member 300 spans the gap 280 created by the first wiper portion 210 and the second wiper portion 240.

As illustrated in FIGS. 7 and 8, the retainer member 210 may have one or more retainer apertures 302 (e.g., through holes, slotted holes, or other closed or open apertures). Moreover, the first fixed end 214 of the first wiper portion 210 and the second fixed end 244 of the second wiper portion 240 may have one or more wiper apertures 224, 254 (e.g., through holes, slotted holes, or other closed or open apertures). Consequently, the first wiper portion 210 and the second wiper portion 240 are operatively coupled to the tape applicator 100 (e.g., a support member of the tape applicator 100, such as a frame, or the like, as discussed herein) through the use of the connectors 310, such as fasteners 320 (e.g., screws, bolts, rivets, pins, nuts, caps, or the like) that pass through the one or more retainer apertures 302 and the one or more wiper apertures 224, 254. In the illustrated embodiment of FIGS. 5 and 6, only two fasteners 320 are used, and the retainer member 300 is utilized to prevent the individual first wiper portion 210 and the second wiper portion 240 from rotating around the single fastener 320 used at the first fixed end 214 and the second fixed end 244.

It should be understood that the retainer member 300, alone or in combination with the one or more first projections 220 (e.g., that form a first channel 222, or the like) of the first fixed end 214 and/or the one or more second projections 250 (e.g., that form a second channel 252, or the like) of the second fixed end 244, are used to restrict rotation of the first wiper portion 210 and/or the second wiper portion 240. In other embodiments, multiple fasteners 320 may be utilized at each fixed end (e.g., two fasteners used on the first fixed end 214, and two fasteners 312 used on the second fixed end 244). In other embodiments, a portion of the first fixed end 214 may be operatively coupled to a portion of the second fixed end 244 (e.g., projection on one end and channel on the other, overlapping portions, interlocking fingers, or the like) in order to aid in restriction the rotation of the first wiper portion 210 and/or the second wiper portion 240. As such, in some embodiments the retainer member 300 may not be needed to prevent rotation of the first wiper portion 210 and/or the second wiper portion 240.

In the embodiments illustrated in FIGS. 5-12, the first wiper portion 210 and the second wiper portion 240 are separate portions that are removably operatively coupled to each other through the retainer member 300. However, in alternate embodiments, it should be understood that in some embodiments the fixed ends 214, 244 may be formed integrally with each other such that the gap 280 only extends a portion of the way into the wiper 200. That is, only a portion of the wiper is split, but the split allows the first free end 212 and the second free end 214 bend independently of each other.

As illustrated in FIGS. 6 and 10, the first wiper portion 210 and the second wiper portion 240 may have different thicknesses along the length of the first wiper portion 210 and the second wiper portion 240. For example, the first fixed end 214 and/or the second fixed end 244 may have a fixed end thickness. Moreover, the first free end 212 and the second free end 242 may have a free end thickness. In some embodiments, the fixed end thickness may be greater than the free end thickness. As illustrated in FIGS. 6 and 10, the thickness of the first wiper portion 210 and the second wiper portion 240 may taper from the first fixed end 214 and the second fixed end 244 to the first free end 212 and the second free end 242. It should be understood that the thickness may taper as illustrated, may be the same throughout the wiper 200, may increase from the fixed ends 214, 244 to the free ends 212, 242, may be different at different locations of the wiper 200, or the like.

Figure 11:
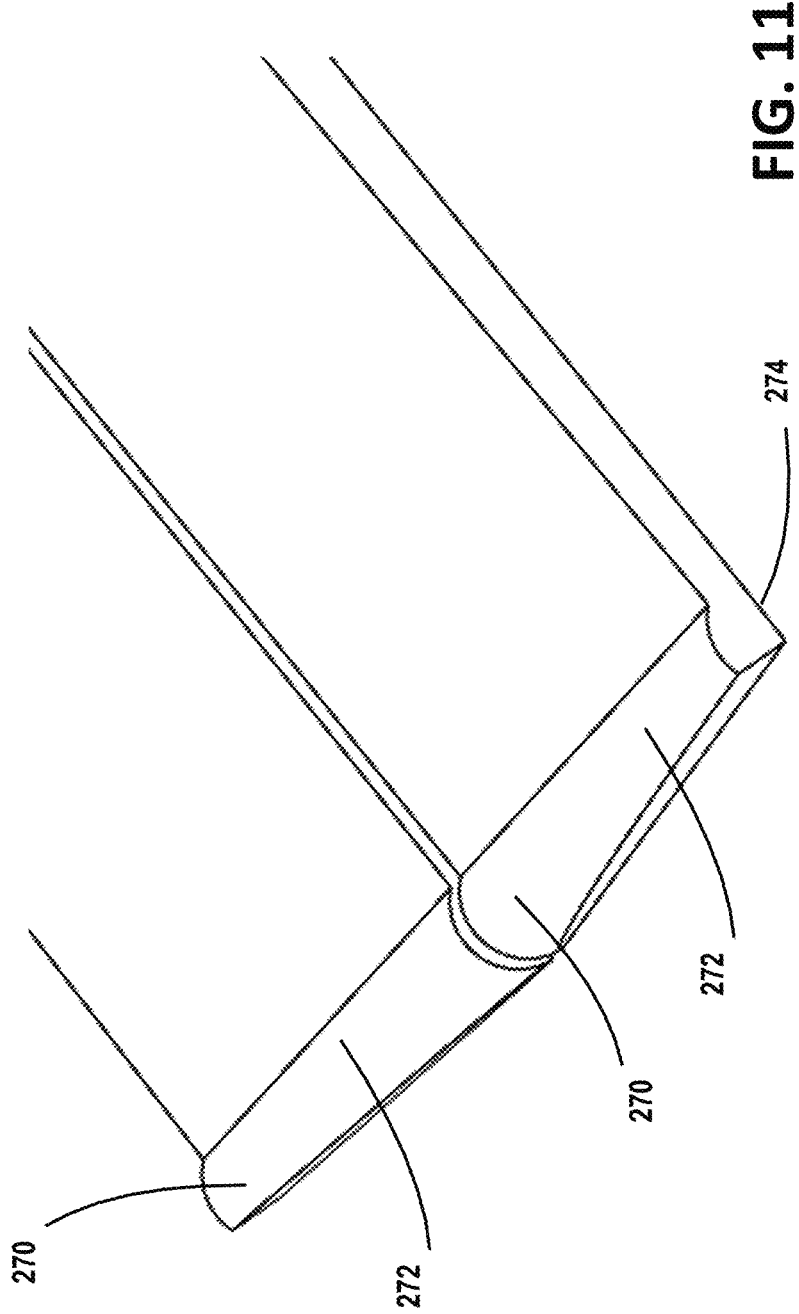
FIG. 11 is a perspective enlarged view of the free ends of a first wiper portion and a second wiper portion of the split wiper of the tape applicator, in accordance with embodiments of the present disclosure.

As illustrated in FIGS. 8, 9, and 11, a first free edge 230 and a second free edge 260 may be angled. For example, as illustrated, outer edges 232, 262 of the first wiper portion 210 and the second wiper portion 240 may be shorter than inner edges 234, 264 of the first wiper portion 210 and the second wiper portion 240. As such, the free edges 230, 260 of the first free end 212 and the second free end 242 may be angled outwardly from the outer edge 232, 262 to the inner edge 234, 264, as illustrated in FIGS. 8, 9, and 11. In other embodiments, it should be understood that the outer edges 232, 262 of the first wiper portion 210 and the second wiper portion 240 may be longer than inner edges 234, 264 of the first wiper portion 210 and the second wiper portion 240. As such, the first free edges 230, 260 of the first free end 212 and the second free end 242 may be angled inwardly from the outer edges 232, 262 to the inner edges 234, 264. It should be understood that the angle of the first free edge 230 on the first free end 212 and the second free edge 260 of the second free end 242 may allow for more uniform pressure being applied to the flaps of a carton when the carton is under-filled or over-filled, and thus, the flaps are partially angled into the carton and/or away from a carton.

In other embodiments, the outer edges 232, 262 and the inner edges 234, 264 of the first wiper portion 210 and the second wiper portion 240 are the same length, and as such, the first free edge 230 and the second free edge 260 are not angled; however, in this configuration when the carton is under-filled or over-filled the first free edge 230 and the second free edge 260 may not fully engage the tape with the flaps of the carton.

Moreover, as illustrated in FIGS. 10 and 11, a surface of the first free end 212 and the second free end 242 may have a profile 270, such as a radiused (e.g., quarter-circle as illustrated, half-circle, circular, oval, or the like), square, rectangular, other polygonal, uniform, or non-uniform profile on an outer surface 272 (e.g., a surface that faces away from a carton). Alternatively, the profile 270 may be located on another surface, such as an inner surface 274 (e.g., a surface that faces a carton). The profile 270 on the first free end 212 and the second free end 242 may provide structural support to the first free end 212 and the second free end 242. For example, the first free end 212 and the second free end 242 may face the greatest forces from engagement with the carton, as such, the profile 270 on the first free end 212 and the second free end 242 may strengthen the free ends 212, 242 of the wiper portions 210, 240. Additionally, the profile 270 on the first free end 212 and the second free end 242 may allow for wearing of the profile 270, such that the first wiper portion 210 and the second wiper portion 40 may still operate if or when the profile 270 wears, thus extending the life of the wiper 200.

The wiper 200 (e.g., first wiper portion 210, second wiper portion 240) discussed herein may be made of any flexible material (e.g., plastic, composite, metal alloy, or the like) that allows the wiper 200 to bend when it contacts the carton. In other embodiments, different portions or sections of the wiper 200 may be made from different materials (e.g., different types, flexibilities, rigidness, or the like).

Figure 12:
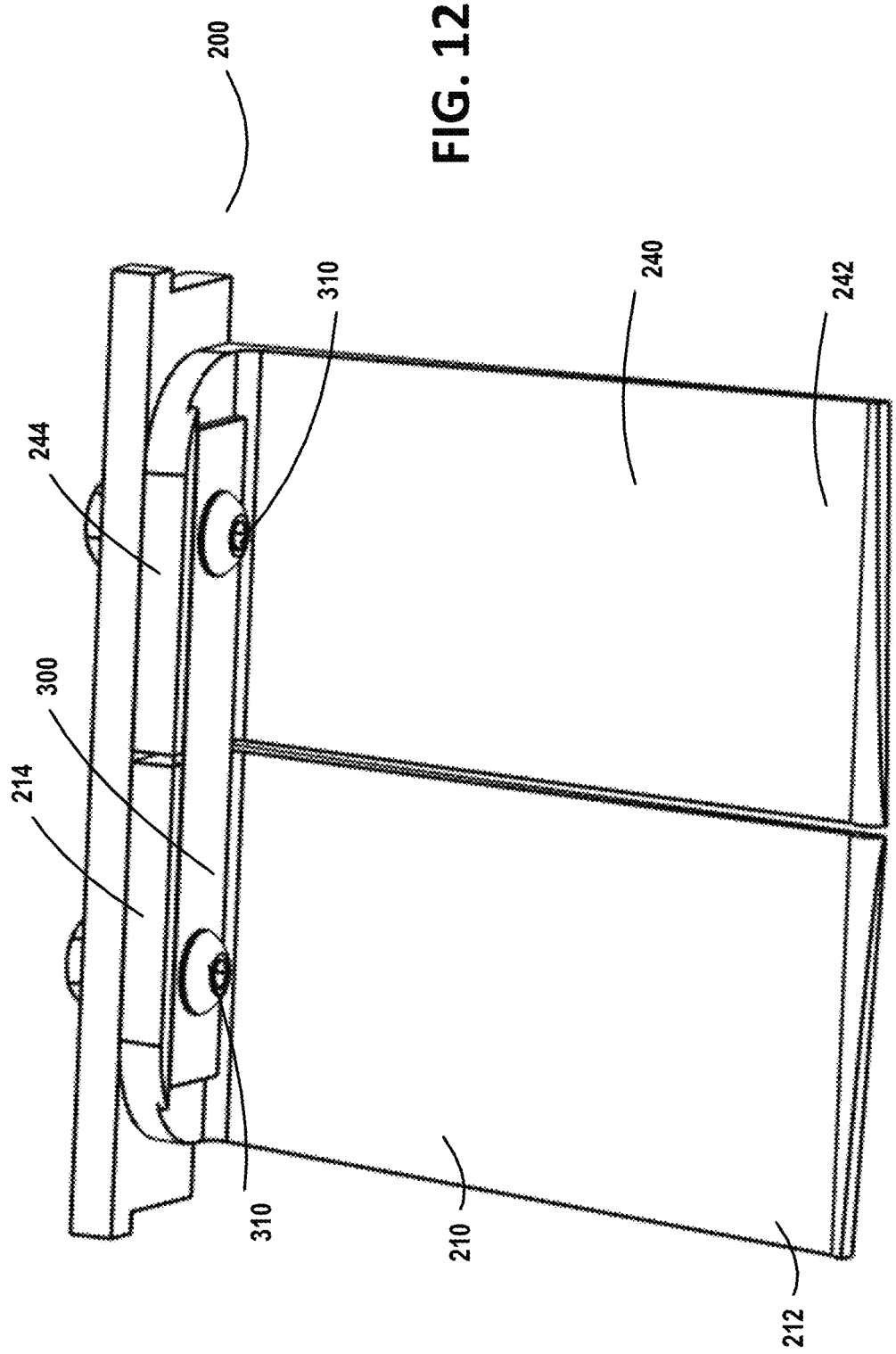
FIG. 12 is a perspective view of an alternate split wiper of the tape applicator, in accordance with embodiments of the present disclosure.

FIG. 12, illustrates an alternate embodiment of the wiper 200, in which the first wiper portion 210 and the second wiper portion 240 are wider than the length of the retainer member 300. As such, the same retainer member 300 may be used for different sized wipers 200.

While only one wiper 200 is illustrated as being used on the tape applicator in the Figures, it should be understood that multiple wipers 200 may be utilized either upstream and/or downstream of a front applicator arm 137, the rear applicator arm 140, or the like. For example, a first wiper 200 having outwardly angled free edges 230, 260, inwardly angled free edges 230, 260, and/or free edges 230, 260 without angles may be utilized to account for cartons having inwardly folded flaps (e.g., outwardly angled free edges 230, 260), outwardly folded flaps (e.g., inwardly angled free edges 230, 260), and/or parallel flaps (e.g., free edges 230, 260 without angels).

The split wiper 200, having the first portion 210 and the second portion 240, allows the wiper portions 210, 240 to operate independently of each other in order to aid in improving application of the pressure sensitive tape to the carton. Specifically, should one or more of the flaps be directed inwardly or outwardly from the carton due to the carton being at least partially over-filled or under-filled, the first wiper portion 210 and the second wiper portion 240 operate independently of each other. As such, the first wiper portion 210 applies pressure to the pressure sensitive tape on a first flap, while the second wiper portion 240 applies pressure to the pressure sensitive tape on a second flap. Consequently, each wiper portion 210, 240 may independently apply pressure (e.g., different pressure) to each flap to independently aid in applying pressure sensitive tape to at least a portion of each flap of the carton.

Furthermore, the gap 280 in the wiper 200, which is formed from the first wiper portion 210 being spaced apart from the second wiper portion 240, aids in preventing the wiper from applying pressure to the adhesive tape at the location of a space in the carton formed between the first flap and the second flap (e.g., regardless if the one or more of the flaps are angled inwardly, angled outwardly, and/or are flat). In this way, the wiper 200 does not apply pressure to the tape at the space in the carton between the flaps, and thus, aids in preventing the tape at the space from adhering to the internal contents of the carton (e.g., the packaging of the carton, the products of the carton, or the like). For example, the wiper 200 described herein would aid in preventing the tape from adhering to paper void fill, bubble wrap, pillow cushions, or other like packaging. Furthermore, the wiper 200 described herein would aid in preventing the tape from adhering to the product in the package and potentially damaging the product when the tape is removed (e.g., ripping the product, leaving tape residue on the product, or the like).

Furthermore, regardless of whether the wiper 200 is a continuous wiper (e.g., no split) or a split wiper, the wiper 200 may be made from a material that allows the wiper (or portions thereof) to act as a spring. As such, the wiper may be bent from a resting position (e.g., when the wiper is straight, such as when the free end is straight) into a curved position as the tape is being applied to the carton, and spring back into the resting position after the wiper moves past the edge of the carton and the tape is applied to the top and side of the carton. For example, in order to allow the wiper to provide the desired spring, the wiper may be made from any type of polymer, such as a thermoplastic polymer like polypropylene. In some embodiments the wiper may be formed from an impact copolymer polypropylene. While the wiper may be made from any type of material, such as rubber, metal alloy, composite, or other like material, in the preferred embodiment the wiper may be made from polypropylene as described above.

In some embodiments, regardless of whether the wiper 200 is a continuous wiper or a split wiper, the wiper edge (e.g., a first free edge 230, a second free edge 260, or the like) on the free end (e.g., first free end 214, a second free end 242, or the like) may have sharp edge (e.g., the edge comes to a point), a rounded edge, or the like. In particular, in the embodiment when the edge (e.g., a first free edge 230, a second free edge 260, or the like) is sharp (e.g., comes to a point), the edge may aid in applying the tape to the carton (e.g., massaging the tape into the fibers of the carton). While the edge is sharp enough to aid in applying the tape to the carton the edge may not be sharp enough to cause damage to the carton (e.g., puncture the cardboard, or the like), cut the tape, scratch or cut a user, or the like.

The wiper 200 discussed herein provides the benefits described above and is an improvement over the use of traditional wipers, brushes, sleds, or the like. For example, with respect to the use of a conventional continuous wiper, when one or more flaps of the carton are directed inwardly or outwardly a continuous wiper would not engage the adhesive tape over both flaps of the carton. For example, when one flap is angled outwardly and a second flap is angled inwardly, a continuous wiper may only apply pressure to the outwardly directed flap and not to the inwardly directed flap because the wiper does not have independent portions that operate independent of each other. Alternatively, in other examples, the conventional continuous wipers may only engage a portion of the tape on both flaps. For example, should both flaps be angled inwardly, a continuous wiper may only engage the tape near the outer edges of the tape and not the internal portion of the tape. In another example, should both flaps be angled outwardly, a continuous wiper may only engage the tape near the middle of the tape and not the outer edges of the tape. Additionally, conventional continuous wipers may apply pressure to an adhesive tape between a space in the carton located between the flaps of the carton.

It should be understood that the present invention is an improvement over conventional brushes that have independent fibers, but which do not apply the desired level of pressure to the adhesive (e.g., because each independent fiber acts independently of each other). Furthermore, the present invention is an improvement over conventional continuous wipers, which do not apply pressure to the adhesive tape across the majority of the tape when cartons are under-filled or over-filled (i.e., when one or more flaps are angled inwardly or outwardly).

Furthermore, while the wiper 200 described herein may be made from any type of material, the wiper may preferably be made from polypropylene, such as an impact copolymer polypropylene. This type of material may provide the desired level of spring in order to allow the wiper to bend during application of the tape, and to spring back into the resting position when the wiper is no longer in contact with the carton. The polypropylene, such as the impact copolymer polypropylene, is an improvement over other types of wiper materials, such as rubber that may not have the same spring, and thus, may not spring back in an initial resting position (e.g., a straight position). That is, some wipers made of some materials, such as rubber wipers, may not return to the original resting position (e.g., rubber wipers may be permanently curved after being bent during use).

While the wiper 200 described herein may have any type of edge, the wiper may have a sharp edge, as previously discussed herein. Having a sharp edge (e.g., an edge that comes to a point) provides an improvement over other types of wipers, brushes, or the like, which do not provide sharp edges to adequately adhere the tape to a carton. That is, wipers that do not have a sharp edge, bushes, or the like fail to adequately massage the pressure sensitive tape into the fibers of the carton to aid in adhering the tape to the carton.

Figure 13B:
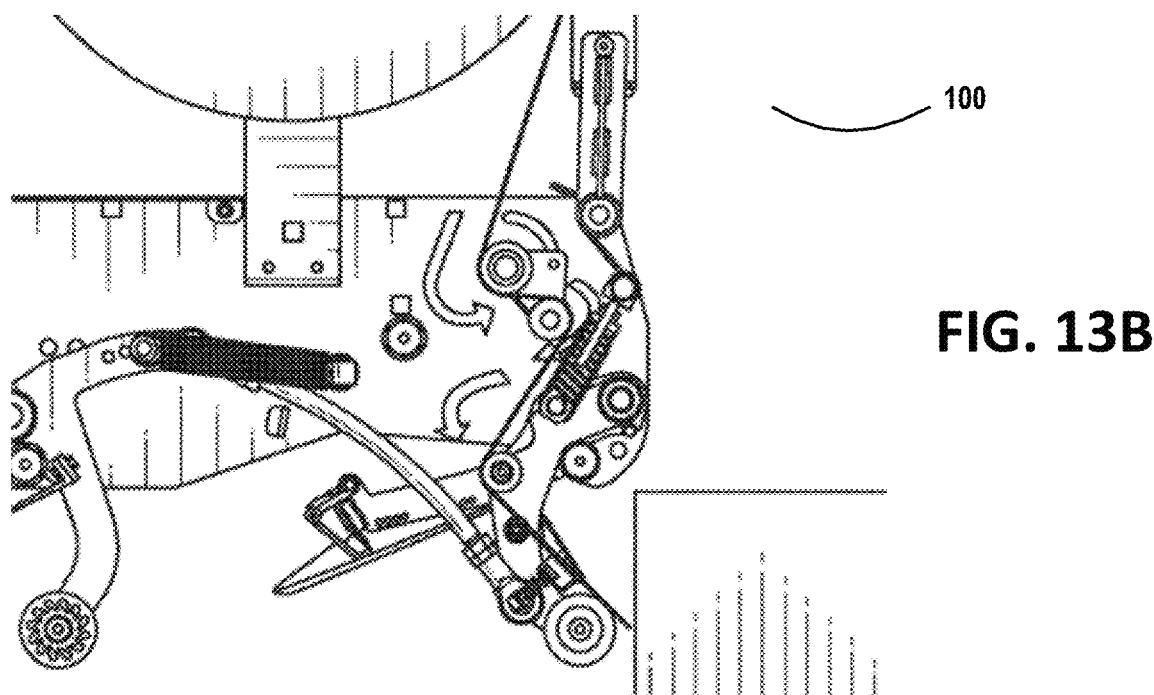
FIG. 13B is side view of the components of the tape applicator when applying tape to a carton, in accordance with embodiments of the present disclosure.
Figure 13C:
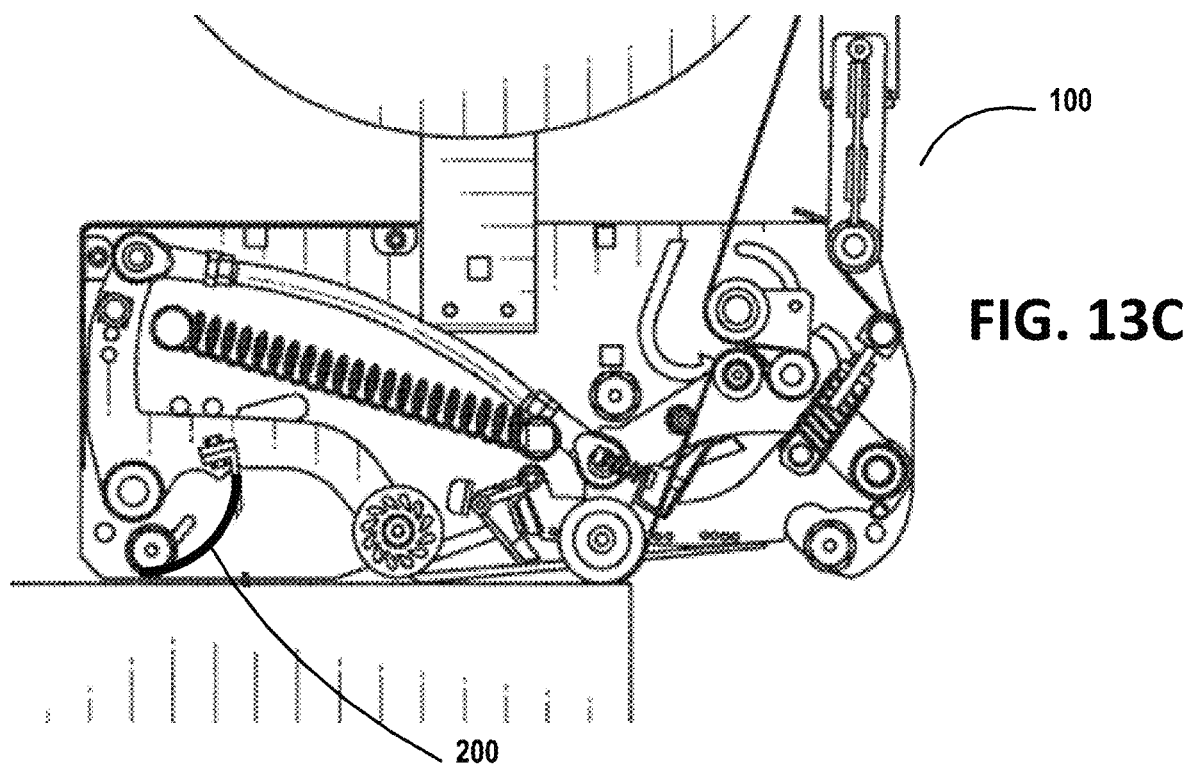
FIG. 13C is side view of the components of the tape applicator when applying tape to a carton, in accordance with embodiments of the present disclosure.

FIGS. 13A-13G illustrate an embodiment of how the tape applicator 100 applies adhesive tape to a carton. As illustrated in FIG. 13A, a carton is moved towards the tape applicator 100 in the direction of the arrow A. As illustrated in FIG. 13B, as the carton moves to engage the tape applicator 100, the front applicator roll 136 may engage a side of the leading edge of the carton to begin applying the tape T to the carton. As the carton continues to move past the tape applicator 100, the knife arm 161 may be rotated toward the main frame (e.g., as a result of the contact between the extensions and the top of the carton), as shown in the illustrated example of FIG. 13C. Moreover, as illustrated in FIG. 13C after the front applicator roll 136 and rear applicator roll 144 apply the pressure sensitive tape to the carton, the wiper 200 described herein further applies pressure to the pressure sensitive tape. As previously described, the wiper 200 may apply pressure to any portion of the tape that was not applied by the front applicator roll 136 and/or the rear applicator roll 144, or in order to apply additional pressure to improve the attachment of the adhesive tape to the carton. As previously described herein, the split wiper 200 having the first portion 210 and the second portion 240 allows the portions of the wiper 200 to operate independently of each other in order to aid in improving application of the pressure sensitive tape to the carton. Consequently, should one or more of the flaps be directed inwardly or outwardly from the carton due to the carton being at least partially over-filled or under-filled, the first wiper portion 210 and the second wiper portion 240 operate independently to apply pressure to the pressure sensitive tape on each flap of the carton. Furthermore, the angled edge of the first free edge 230 on the first free end 212 and the second free edge 260 of the second free end 242 may allow for more uniform pressure being applied to the flaps of a carton when the carton is under-filled or over-filled, and thus, the flaps are partially angled into the carton and/or away from a carton.

Figure 13D:
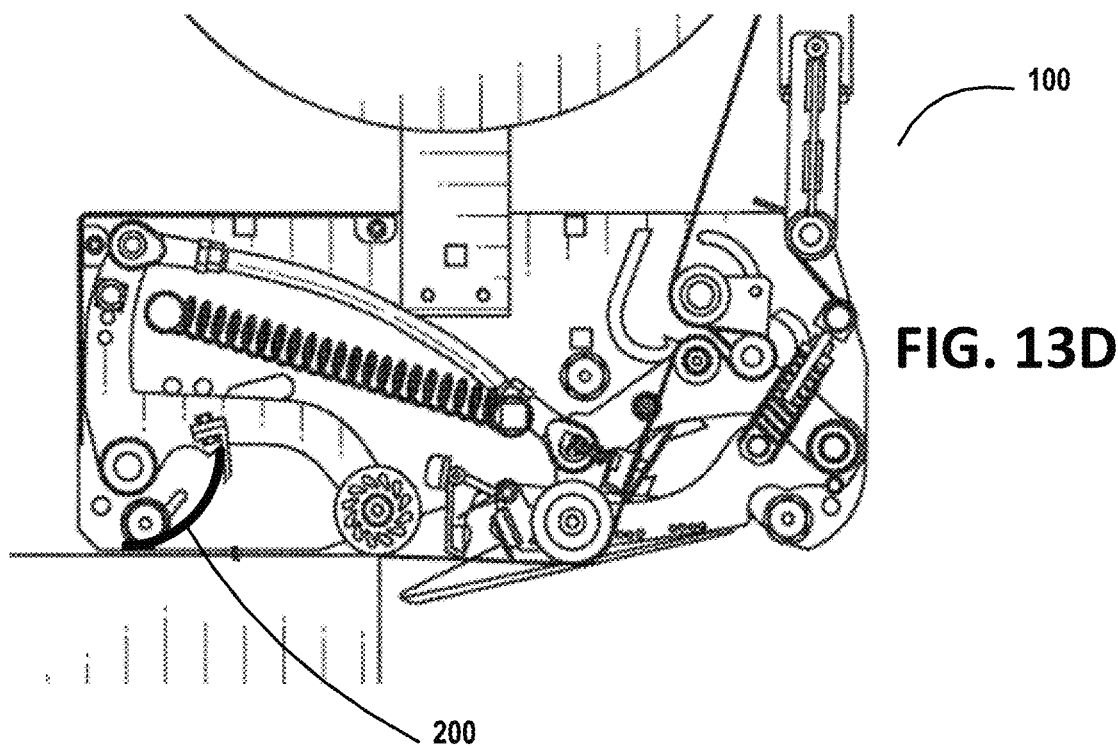
FIG. 13D is side view of the components of the tape applicator when applying tape to a carton, in accordance with embodiments of the present disclosure.
Figure 13E:
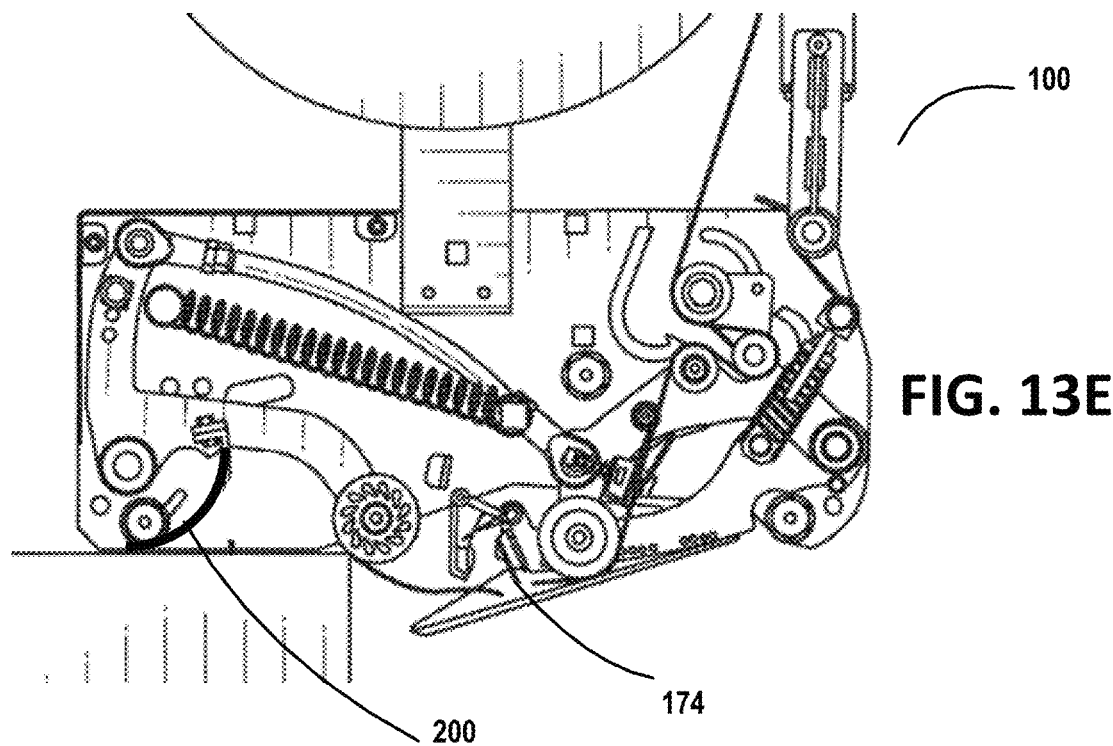
FIG. 13E is side view of the components of the tape applicator when applying tape to a carton, in accordance with embodiments of the present disclosure.
Figure 13F:
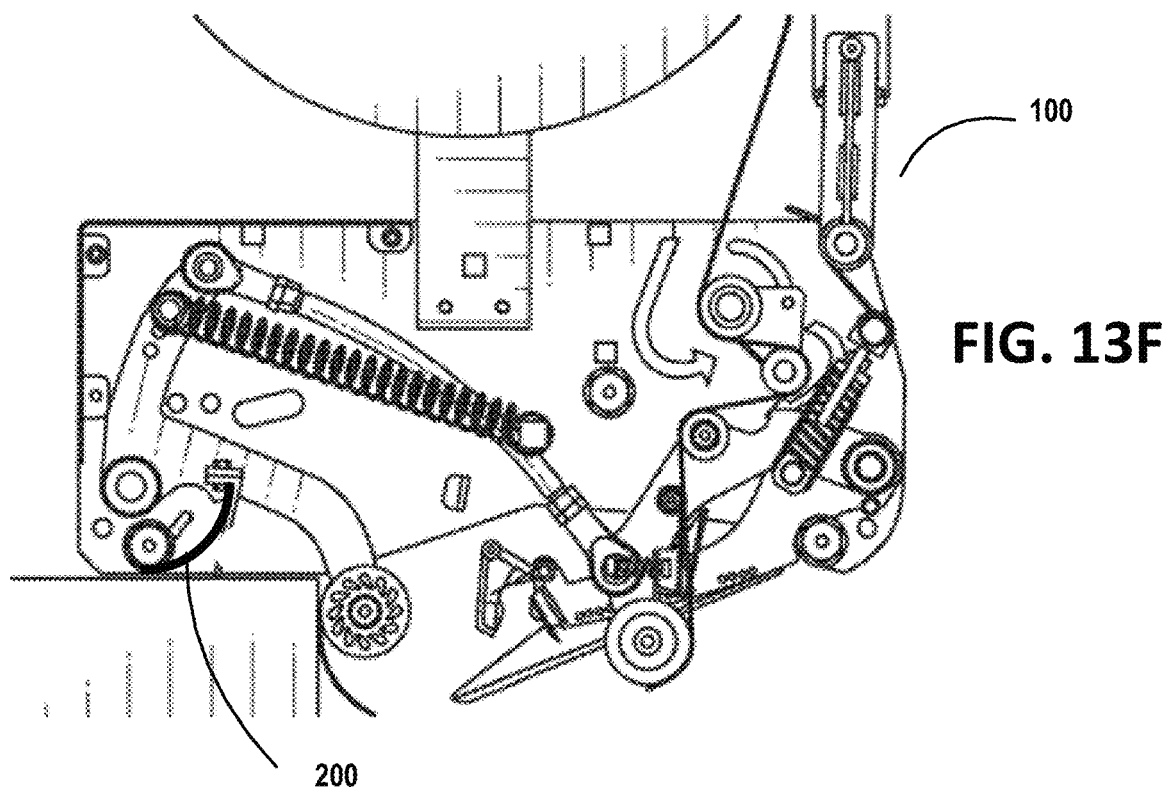
FIG. 13F is side view of the components of the tape applicator when applying tape to a carton, in accordance with embodiments of the present disclosure.

As further illustrated in FIG. 13C, the extensions of the knife arm may ride along the carton (e.g., generally maintaining the position of the knife arm rotated toward the main frame). With the extensions riding along the carton, the catch may be held in an equilibrium position relative to the magnet, and the guard may be in the closed position relative to the blade. Referring to FIGS. 13D and 13E, as the tape applicator 100 moves past the trailing edge of the carton, the extensions of the knife arm may move beyond the trailing edge of the carton. Once the extensions of the knife arm clear the trailing edge of the carton, the knife arm 161 may be free to rotate away from the main frame under the biasing force of the compressing spring acting on the knife arm 161. With particular reference to FIG. 13E, as the knife arm 161 rotates away from the main frame, the magnet may continue to attract the catch. The continued movement of the knife arm 161 away from the main frame, in conjunction with the attraction between the catch and the magnet, may move the guard to the open position, at least partially exposing the blade. With the blade at least partially exposed, and as a result of the movement of the knife arm 161 away from the main frame, the blade may contact the tape, allowing the blade to cut the tape. As shown in FIGS. 13E and 13F, as the tape is cut by the blade, and the knife arm 161 continues to rotate away from the main frame, the catch may separate from the magnet (e.g., due to an increasing spring force of the torsion spring urging the guard toward the closed position and/or the guard reaching an end range of motion relative to the knife arm 161, due to a stop or other physical constriction). For at least a portion of the travel of the guard away from the magnet (e.g., at least a portion of the separation of the catch from the magnet), the magnetic attraction may maintain the guard in the open position.

However, as the separation increases the attraction may decrease, and may be overcome by the spring force urging the guard to the closed position.

Figure 13G:
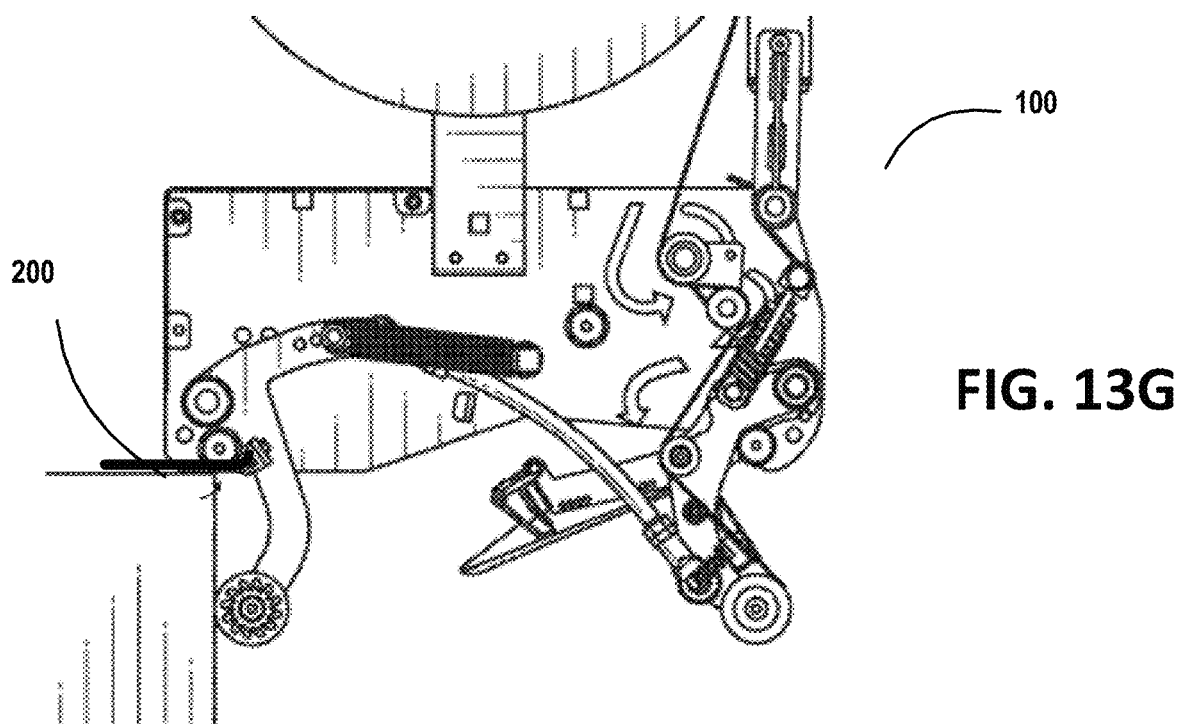
FIG. 13G is side view of the components of the tape applicator when applying tape to a carton, in accordance with embodiments of the present disclosure.

Referring to FIG. 13G, once the spring force overcomes the magnetic attraction, the guard may be returned to the closed position relative to the blade under the biasing force of the spring. When the guard is in the closed position, the blade may be at least partially covered by the guard, (e.g., so as to prevent inadvertent contact with the blade). Additionally, as shown in FIG. 13G, as the carton continues to move past the tape applicator 100, the rear applicator roller 144 may follow the end of the carton at the trailing edge of the carton, thereby adhering the tape down at least a portion of the end of the carton. Furthermore, as the wiper 200 moves past the trailing edge of the carton, the wiper 200 may also apply pressure to at least a portion of the tape on the side of the carton.

Consistent with some embodiments, the geometries, flexibility, and/or ranges of motion of the rollers 136, 144 and/or the one or more wipers 200 may be selected to achieve a desired pressure to apply to the tape for adherence with the carton flaps. Additionally, it will be appreciated that, consistent with various embodiments of the present disclosure, the tape applicator 100 may be stationary and the carton may move relative to the tape applicator 100 (e.g., on a conveyer, roller bed, etc.), the carton may be stationary, and the tape applicator 100 may move relative to the carton, and/or both the carton and the tape applicator 100 may move relative to one another to effectuate the application of tape to the carton by the tape applicator 100.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

Certain terminology is used herein for convenience only and is not to be taken as a limiting, unless such terminology is specifically described herein for specific embodiments. For example, words such as "top", "bottom", "upper", "lower", "first", "second", "inner", "outer", or the like may merely describe the configurations shown in the Figures and described herein for some embodiments of the invention. Indeed, the components may be oriented in any direction and the terminology, therefore, should be understood as encompassing such variations unless specified otherwise. The terminology includes the words specifically mentioned above, derivatives thereof and words of similar import.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed:

1. A tape applicator comprising:
   one or more support members; and
   a wiper comprising:
     a first portion comprising a first free end; and
     a second portion comprising a second free end;
     wherein a first edge on the first free end and a second edge on the second free end are angled outwardly from outer edges to inner edges of the first portion and the second portion or angled inwardly from the outer edges to the inner edges of the first portion and the second portion;
     wherein the first portion and the second portion of the wiper are operatively coupled to the one or more support members; and
     wherein the first portion flexes independently from the second portion to allow the first portion to apply pressure to the tape on a first flap of a carton and the second portion to apply pressure to the tape on a second flap of the carton independently of the first portion.

2. The tape applicator of claim 1, wherein the first portion and the second portion are independent portions that are operatively coupled to one of the one or more support members independently.

3. The tape applicator of claim 1, wherein the first portion comprises a first fixed end and the second portion comprises a second fixed end.

4. The tape applicator of claim 3, wherein the first portion is operatively coupled to the second portion and to a support member of the one of the one or more support members.

5. The tape applicator of claim 4, wherein the first portion is operatively coupled to the second portion using a retainer member.

6. The tape applicator of claim 5, wherein the first portion comprises a first projection, and the second portion comprises a second projection, and wherein the first projection and the second projection restrict movement of the retainer member.

7. The tape applicator of claim 6, wherein the first projection forms a first channel in the first fixed end and the second projection forms a second channel in the second fixed end.

8. The tape applicator of claim 5, further comprising:
   one or more fasteners operatively coupling the first portion and the second portion to the one or more support members, wherein the retainer member has retainer member apertures, wherein the first fixed end has a first aperture, wherein the second fixed end has a second aperture, and wherein the fasteners operatively couple the retainer member, the first fixed end, the second fixed end, and the support member through the retainer member apertures, the first aperture, and the second aperture.

9. The tape applicator of claim 3, further comprising:
one or more connectors operatively coupling the first fixed end of the first portion and the second fixed end of the second portion to the one or more support members.

10. The tape applicator of claim 3, wherein the first fixed end and the second fixed end are angled out of plane with respect to the first free end and the second free end.

11. The tape applicator of claim 3, wherein the first fixed end and the second fixed end have a fixed end thickness, and the first free end and the second free end have a free end thickness, and wherein the fixed end thickness is greater than the free end thickness.

12. The tape applicator of claim 11, wherein the fixed end thickness tapers to the free end thickness.

13. The tape applicator of claim 3, wherein the first free end and the second free end comprise a profile on a surface.

14. The tape applicator of claim 1, wherein the first edge on the first free end and the second edge on the second free end are angled outwardly from the outer edges to the inner edges of the first portion and the second portion.

15. The tape applicator of claim 1, wherein the first edge on the first free end and the second edge on the second free end are angled inwardly from the outer edges to the inner edges of the first portion and the second portion.

16. The tape applicator of claim 1, wherein the wiper is made of polypropylene.

17. The tape applicator of claim 1, wherein the one or more support members comprise a front applicator arm, a rear applicator arm, a portion of a frame, or a portion of a frame cover.

18. A method of applying tape to cartons using a tape applicator, the method comprising:
applying the tape to a first flap and a second flap of a carton using the tape applicator;
applying pressure to the tape using a wiper, wherein the wiper comprises:
a first portion comprising a first free end; and
a second portion comprising a second free end;
wherein a first edge on the first free end and a second edge on the second free end are angled outwardly from outer edges to inner edges of the first portion and the second portion or angled inwardly from the outer edges to the inner edges of the first portion and the second portion; and
wherein the first portion flexes independently from the second portion to allow the first portion to apply pressure to the tape on the first flap and the second portion to apply pressure to the tape on the second flap independently of the first portion.

19. The method of claim 18, wherein the first portion and the second portion are independent portions that are operatively coupled to one or more support members independently.

20. The method of claim 18, wherein the first portion is operatively coupled to the second portion using a retainer member.

\* \* \* \* \*